United States Patent
Roediger et al.

(10) Patent No.: US 8,701,098 B2
(45) Date of Patent: Apr. 15, 2014

(54) LEVERAGING MULTICORE SYSTEMS WHEN COMPILING PROCEDURES

(75) Inventors: Robert R. Roediger, Rochester, MN (US); William J. Schmidt, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1315 days.

(21) Appl. No.: 12/417,376

(22) Filed: Apr. 2, 2009

(65) Prior Publication Data

US 2010/0257516 A1 Oct. 7, 2010

(51) Int. Cl.
*G06F 9/45* (2006.01)

(52) U.S. Cl.
USPC .................. 717/155; 717/154; 717/160

(58) Field of Classification Search
USPC .......................................... 717/155
See application file for complete search history.

(56) References Cited

U.S. PATENT DOCUMENTS

| | | | |
|---|---|---|---|
| 5,991,792 A | 11/1999 | Nageswaran | |
| 6,622,301 B1 * | 9/2003 | Hirooka et al. | 717/149 |
| 7,213,238 B2 * | 5/2007 | Klarer et al. | 717/140 |
| 7,237,242 B2 | 6/2007 | Blythe et al. | |
| 2005/0086653 A1 * | 4/2005 | Heishi et al. | 717/151 |
| 2005/0138613 A1 * | 6/2005 | Archambault et al. | 717/160 |
| 2005/0166205 A1 * | 7/2005 | Oskin et al. | 718/103 |
| 2008/0022283 A1 | 1/2008 | Krieger et al. | |
| 2008/0229321 A1 | 9/2008 | Krieger et al. | |

* cited by examiner

*Primary Examiner* — Idriss N Alrobaye
*Assistant Examiner* — Brooke Taylor
(74) *Attorney, Agent, or Firm* — Wood, Herron & Evans, LLP

(57) ABSTRACT

A method, apparatus and program product are provided for parallelizing analysis and optimization in a compiler. A plurality of basic blocks and a subset of data points of a computer program is prepared for processing by a main thread selected from a plurality of hardware threads. The plurality of prepared basic blocks and subset of data points are placed in a shared data structure by the main thread. A prepared basic block of the plurality of prepared basic blocks and/or a tuple associated with the subset of data points is concurrently retrieved from the shared data structure by a work thread selected from the plurality of hardware threads. A compiler analysis or optimization is performed on the prepared basic block or tuple by the work thread.

20 Claims, 9 Drawing Sheets

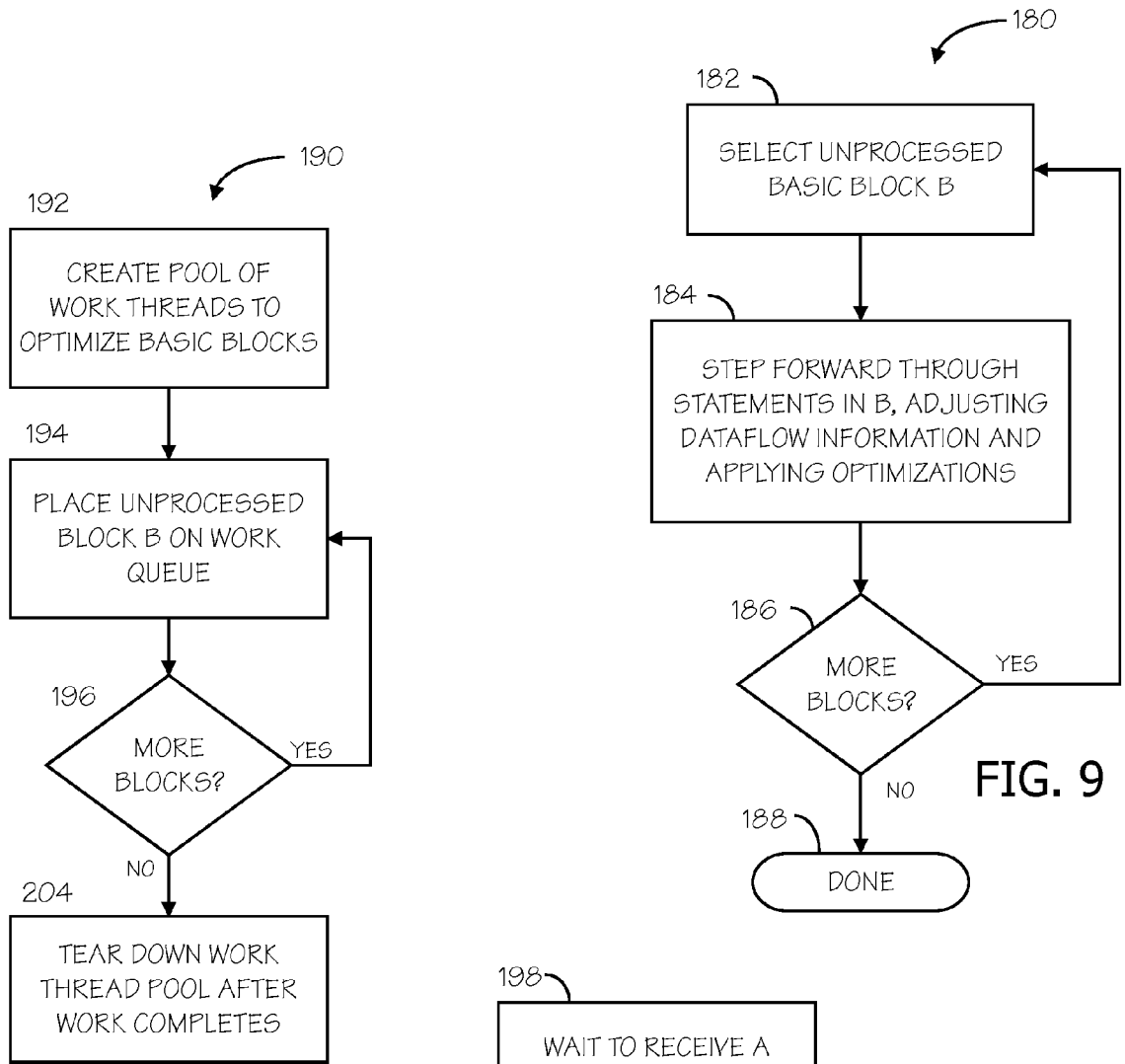
FIG. 9
FIG. 10
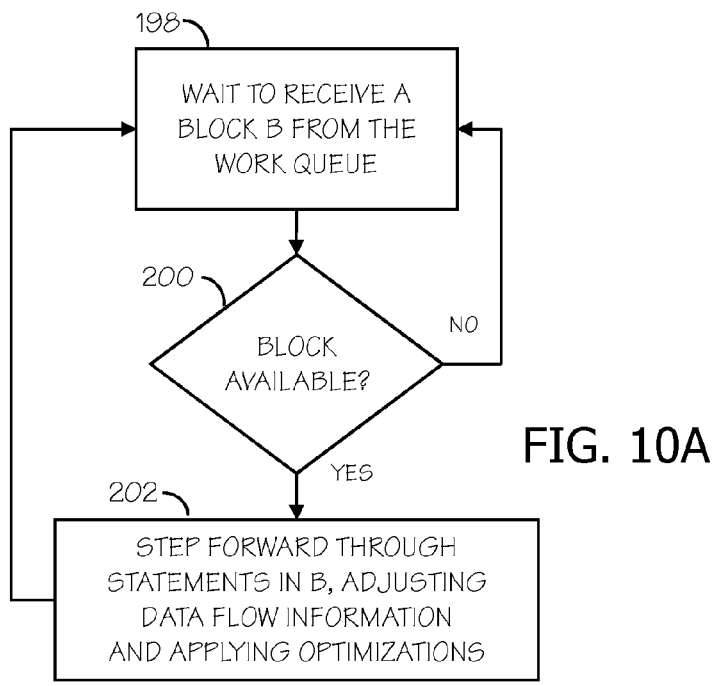
FIG. 10A

LEVERAGING MULTICORE SYSTEMS WHEN COMPILING PROCEDURES

FIELD OF THE INVENTION

The present invention relates to computers and data processing, and more particularly to parallelization of compilers.

BACKGROUND OF THE INVENTION

Contemporary trends in hardware design are evolving. Rather than continuing to push the envelope in terms of maximizing clock speeds to increase single-threaded performance, hardware designs are evolving toward slowing clock speeds and increasing the number of concurrent threads of execution in a system, e.g., using multiple microprocessors, microprocessors with multiple cores and/or microprocessors with multiple hardware threads (e.g., with multiple hardware threads per core). Each hardware thread in a multithreaded processor is treated like an independent processor by the software resident in the computer. Such designs provide increased throughput at lower power cost. However, these designs also degrade single-threaded performance due to the slower clock speeds. A side effect of such designs is that tasks which are not parallelized to take advantage of multiple cores will appear to run more slowly on new systems than they did on older systems with faster clock speeds.

One particular area of concern for organizations that develop software is the possibility that compile times will increase. To take advantage of the trend of multiple hardware threads with slower clock speeds, where possible, compilers need to take advantage of the multiple hardware threads to perform different parts of the compiling process simultaneously. In programs that consist of many small procedures, this is relatively straightforward: a compiler can spawn multiple threads to compile individual procedures on different processors and gather the results produced by the threads to package the final program. The larger challenge is for compilation of larger or legacy procedures.

The compilation process consists of many steps. The most time-consuming of these steps tends to be the global optimization step. Most global optimizations are based on data flow analyses, which are algorithms to gather information about a program. Data flow analysis refers to a body of techniques that derive information about the flow of data along program execution paths. For example, one way to implement global common sub-expression elimination requires the determination of whether two textually identical expressions evaluate to the same value along any possible execution path of the program. As another example, if the result of an assignment is not used along any subsequent execution path, then the assignment can be eliminated as dead code. In each application of data flow analysis, every program point has associated with it a data flow value that represents an abstraction of the set of all possible program states that can be observed for that point. The set of possible data flow values is the domain for this application. For example, the domain of data flow values for reaching definitions is the set of all subsets of definitions in the program. A particular data flow value is a set of definitions and each point in the program is associated with the exact set of definitions that can reach that point. The choice of abstraction depends on the goal of the analysis. To be efficient, only the information that is relevant is tracked.

The results for data flow analyses generally have the same form: for each instruction in the program, the results specify some property that must hold every time that instruction is executed. As set forth above, the analyses differ, however, in the properties they compute. For example, a constant-propagation analysis computes, for each point in the program, and for each variable used by the program, whether that variable has a unique constant value at that point. As another example, a liveness analysis determines, for each point in the program, whether the value held by a particular variable at that point is sure to be overwritten before it is read again. If so, there is no need to preserve that value, either in a register or in a memory location.

Spawning multiple threads to compile individual procedures on different processors, however, breaks down for code that is not built in a modular fashion. Many programs in use today are constructed from single monolithic procedures, which cannot benefit from compiling procedures in parallel. A number of these programs are old enough to predate the common use of modular programming styles, while others are written in older languages that discourage the use of multiple procedures. Regardless of the cause, there are many such programs in existence on many different platforms. Further, even programs written in a more modular style often contain some very large procedures as a result of poor design or maintenance. A solution is needed, therefore, to improve compile times for large procedures as the hardware development trends continue to move toward slower clock speeds and many available hardware threads.

SUMMARY OF THE INVENTION

A method, apparatus and program product are provided for parallelizing the analysis and optimization phases in a compiler. A plurality of hardware threads is allocated for parallel processing. A plurality of basic blocks of a computer program is prepared for processing by a main thread selected from the plurality of hardware threads. The plurality of prepared basic blocks is then placed in a shared data structure by the main thread. Concurrently with placing the prepared basic blocks in the shared data structure, a prepared basic block of the plurality of prepared basic blocks is retrieved from the shared data structure by a work thread selected from the plurality of hardware threads and a compiler analysis or optimization is performed on the prepared basic block by the work thread.

In some embodiments, performing the compiler analysis or optimization on the prepared basic block includes gathering local data from the basic block for use in a data flow analysis. In other embodiments, performing the compiler optimization on the prepared basic block includes stepping through statements in the basic block, adjusting data flow information, and applying optimizations.

In still other embodiments, preparing a plurality of basic blocks includes creating a dependency graph of a plurality of loops in a program and identifying a plurality of unconstrained loops on the dependency graph. In these embodiments, placing the plurality of prepared basic blocks in the shared data structure includes placing the plurality of unconstrained loops in the shared data structure and retrieving the prepared basic block includes receiving a loop from the shared data structure. Performing the compiler optimization on the prepared basic block for these embodiments includes optimizing the received loop by the work thread and removing a dependency from a loop containing the optimized loop, then placing the containing loop in the shared data structure for further processing.

In an alternate embodiment for parallelizing analysis and optimization in a compiler, a subset of data points of a computer program is identified for processing by a main thread selected from a plurality of hardware threads. The subset of data points is placed in a shared data structure by the main thread. A tuple associated with the subset of data points from the shared data structure is retrieved by a work thread selected from the plurality of hardware threads concurrently with placing the subset of data points in the shared data structure. A compiler analysis or optimization is performed on the tuple by the work thread. In some embodiments, a compiler analysis or optimization on the tuple may include initializing data flow sets for data flow calculations, and performing the data flow calculations on the subset of data points by the work thread. The subset of data points may correspond to a cache size.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIG. 9 is a flowchart of a non-parallel method for propagating results from the data flow analysis.

FIG. 10 is a flowchart of a parallelized method of propagating results from the data flow analysis.

FIG. 10A is a detailed flowchart of an exemplary work thread of FIG. 10.

Figures 1, 2:
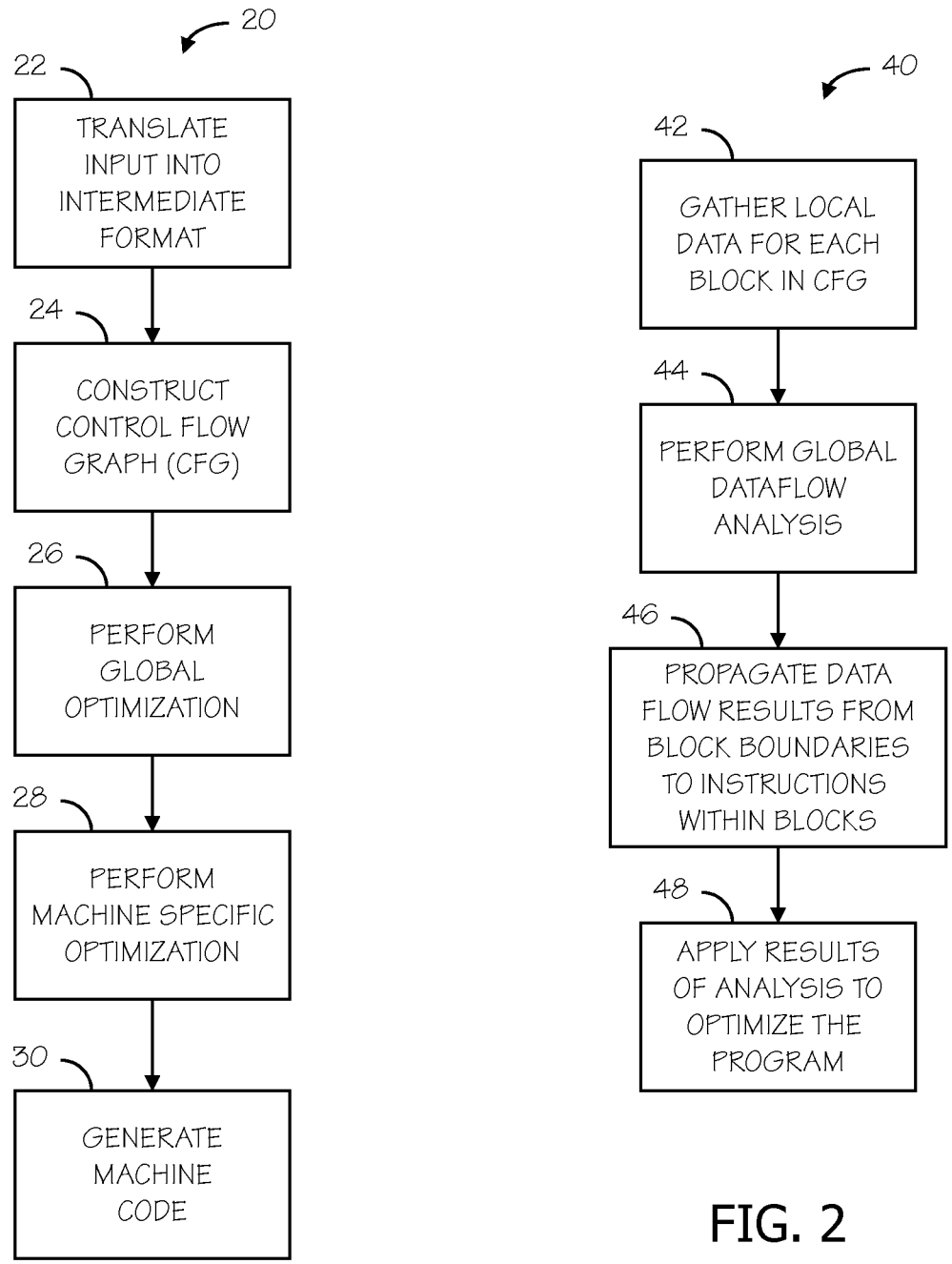
FIG. 1 is a flowchart of the general structure of a process for compiling.
FIG. 2 is a detailed flowchart of the global optimization step in FIG. 1.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

A compiler is a computer program (or set of programs) that translates text written in a computer language (the source language) into another computer language (the target language). The original sequence is usually called the source code and the output called object code. Commonly the output has a form suitable for processing by other programs (e.g., a linker), but it may also be a human-readable text file. Compilers may compile the source code to intermediate code, or the intermediate code to object code. Some compilers, known as cross compilers, can compile programs for use by computers different than the computer running the compiler.

Compilers generally perform many or all of the following operations: lexical analysis, preprocessing, parsing, semantic analysis, code generation, and code optimization. The general structure of a compiler is shown in flowchart 20 in FIG. 1. Input to the compiler is translated in to an intermediate language for the compiler (block 22). A control flow graph ("CFG") is constructed in block 24. A control flow graph is a representation, using graph notations, of all paths that might be traversed through a program during its execution. Each node in the graph represents a basic block ("B"). A basic block is a maximal sequence of straight-line code. Basic blocks are assembled into the control CFG by placing a directed arc from block A to block B if and only if control can flow from block A to block B. Using the CFG a global optimization is then performed (block 26). After the global optimization, on some systems, a machine-specific optimization may also be performed (block 28). After the optimization(s) have completed, the compiler generates machine code (block 30) that is either ready for execution or ready to be sent to a linker for combination with other sections of machine code that form the program.

A significant amount of compilation time is attributable to the global optimization phases (block 26). Many global optimizations follow the same general structure which is shown in flowchart 40 in FIG. 2. Local data is gathered for each basic block in the program (block 42). In an "available expressions" calculation, for example, the local data for a block B consists of a list of expressions available to subsequent blocks after the block has been executed. A global data flow analysis is then performed to simultaneously solve a number of similar problems at basic block boundaries (block 44). For example, a "live variables" problem calculates which variables have anticipated uses at the beginning of each basic block B. Next, the data flow analysis is completed by propagating the results gathered at block boundaries though each basic block (block 46). Finally, the results of the data flow analysis are applied to optimize the program (block 48). In some implementations, steps 3 and 4 (blocks 46 and 48) may be performed simultaneously. Parallelization opportunities exist in each of these steps.

Figure 3:
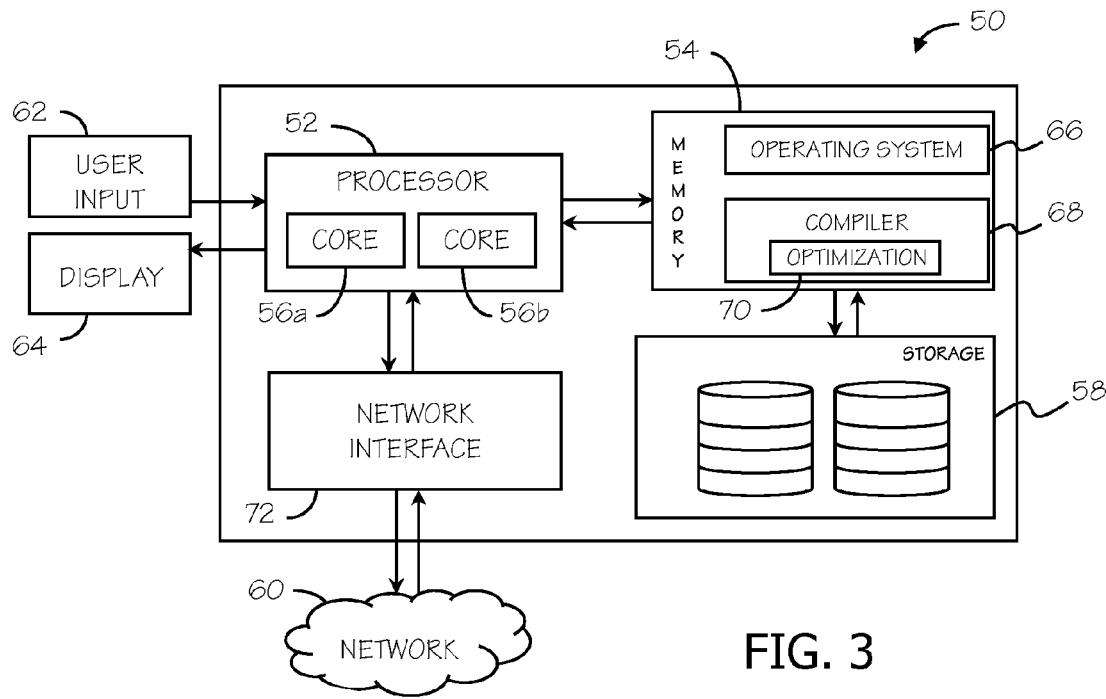
FIG. 3 is a block diagram of an exemplary hardware and software environment for a computer suitable for implementing parallelized global optimization consistent with embodiments of the invention.

FIG. 3 illustrates an exemplary hardware and software environment for an apparatus 50 suitable for parallelizing compilers and global optimization consistent with the invention. For the purposes of the invention, apparatus 50 may represent practically any computer, computer system, or programmable device, e.g., multi-user or single-user computers, desktop computers, portable computers and devices, handheld devices, network devices, mobile phones, etc. Apparatus 50 will hereinafter be referred to as a "computer" although it should be appreciated that the term "apparatus" may also include other suitable programmable electronic devices.

Computer 50 generally includes at least one processor 52 coupled to a memory 54, and the computer supports multiple hardware threads, i.e., multiple independent units of execution. It will be appreciated, however, that software-based multithreading or multitasking may also be used in connection with hardware-based multithreading, e.g., by allocating time slices on a given hardware thread to multiple software threads or tasks, to further support the parallel performance of multiple tasks in the computer. The manner in which multiple hardware threads may be distributed within computer 50 can vary in different embodiments. For example, processor 52, e.g. a microprocessor, may be implemented as a single processor core that includes multiple hardware threads, or may include multiple processor cores 56a, 56b, each of which may support one or more hardware threads. Alternatively, as shown in the block diagram in FIG. 4, computer 50a may contain multiple processors 52a, 52b, 52c, for example. Each of these processors 52a, 52b, 52c may also have multiple cores as illustrated with processor 52 in FIG. 3. Each of the cores on each of the processors may support one or more hardware threads, which may be utilized for parallel processing. Furthermore, multiple computers, such as computer 50 in FIG. 3 or computer 50a in FIG. 4, each incorporating at least one hardware thread, may communicate over a high speed network in a distributed parallel computing environment, in order to provide the multiple hardware threads utilized to implement embodiments of the invention.

Consistent with embodiments of the invention, a hardware thread is at least a portion of a processor configured to process at least a portion of a task. For the most part, each hardware thread is treated like an independent processor by software resident in the computer system upon which it is configured. Thus, each hardware thread may provide an independent unit of execution to process that at least a portion of a task. Therefore, in a multithreaded processor, multiple independent units of execution may each process at least a portion of a task concurrently.

In some embodiments, computer hardware may provide information as to which hardware threads executing on a processor core are using or have used which processing elements or functional units or the like on the processor core. The computer hardware may also provide information pertaining to memory utilization of a hardware thread, for instance, the hardware thread's use of cache on the processor core. Additional characteristics or attributes of the hardware threads may be provided. The operating system uses this information to predict resource availability for scheduling applications, to reserve a particular processing element for a given thread, and to otherwise guarantee quality of service to applications. In other embodiments, the information may be provided for a given set of hardware threads, and the operating system or the like may use the information to predict resource availability and reserve processing elements for a given set of hardware threads. Setting up and maintaining a thread pool as well as managing hardware threads in multithreaded processor environments is well known in the art. Some examples may be found in U.S. Pat. No. 7,237,242 to Blythe et al., U.S. Pat. No. 5,991,792 to Blythe et al., U.S. Patent Application Publication No. 2008/0022283 to Krieger et al., and U.S. Patent Application Publication No. 2008/0229321 to Krieger et al., the disclosures of which are hereby incorporated by reference herein in their entireties.

Memory 54 may represent the random access memory (RAM) devices comprising the main storage of computer 50, as well as any supplemental levels of memory, e.g., cache memories, non-volatile or backup memories (e.g. programmable or flash memories), read-only memories, etc. In addition, memory 54 may be considered to include memory storage physically located elsewhere in computer 50, e.g., any cache memory in a processor 52, as well as any storage capacity used as a virtual memory, e.g., as stored on a mass storage device 58 or another computer coupled to computer 50 via a network 60.

Computer 50 also typically receives a number of inputs and outputs for communicating information externally. For interface with a user or operator, computer 50 typically includes one or more user input devices 62 (e.g., a keyboard, a mouse, a trackball, a joystick, a touchpad, a keypad, a stylus, and/or a microphone, among others). Computer 50 may also include a display 64 (e.g., a CRT monitor, an LCD display panel, and/or a speaker, among others). The interface to computer 50 may also be through an external terminal connected directly or remotely to computer 50, or through another computer communicating with computer 50 via a network 60, modem, or other type of communications device.

Computer 50 operates under the control of an operating system 66, and executes or otherwise relies upon various computer software applications, components, programs, objects, modules, data structures, etc. (e.g. compiler 68). Compiler application 68, for example, further includes the components discussed in relation to FIG. 1 and FIG. 2, such as global optimization 70. Computer 50 communicates on the network 60 through a network interface 72.

In general, the routines executed to implement the embodiments of the invention, whether implemented as part of an operating system or a specific application, component, program, object, module or sequence of instructions will be referred to herein as "computer program code", or simply "program code". The computer program code typically comprises one or more instructions that are resident at various times in various memory and storage devices in a computer, and that, when read and executed by one or more processors in a computer, causes that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution. Examples of computer readable media include but are not limited to physical, recordable type media such as volatile and non-volatile memory devices, floppy and other removable disks, hard disk drives, optical disks (e.g., CD-ROM's, DVD's, etc.), among others.

In addition, various program code described hereinafter may be identified based upon the application or software component within which it is implemented in specific embodiments of the invention. However, it should be appreciated that any particular program nomenclature that follows is merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Figure 4:
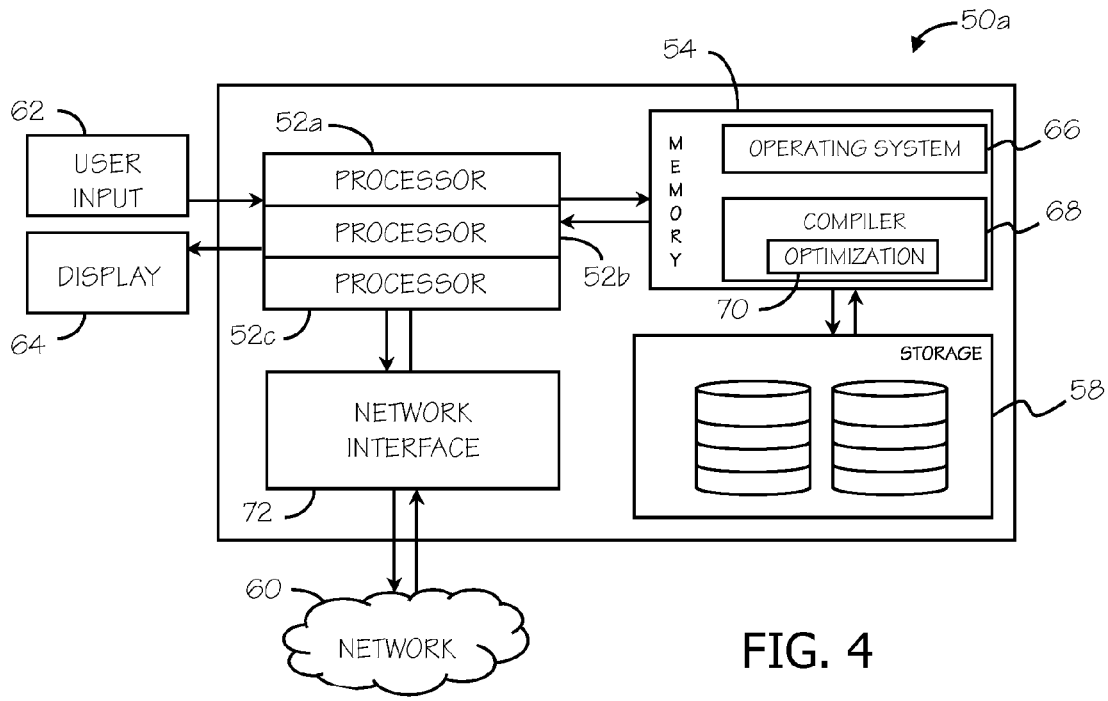
FIG. 4 is a block diagram of an alternate exemplary hardware and software environment for a computer suitable for implementing parallelized global optimization consistent with embodiments of the invention.

Those skilled in the art will recognize that the exemplary environment illustrated in FIG. 3 or 4 is not intended to limit the present invention. Indeed, those skilled in the art will recognize that other alternative hardware and/or software environments, such as other parallel configurations including nodes on a high speed network, may be used without departing from the scope of the invention.

Referring again to FIG. 2, global optimization is generally divided into four steps, each step having opportunities for parallel processing. These four steps, as illustrated in FIG. 2, are gathering local data (block 42), global data flow analysis (block 44), propagating data flow results (block 46), and applying results to optimize (block 48). Each of these steps will be addressed in turn, including the opportunities for parallel processing within each of the steps.

Gathering Local Data

Figure 5:
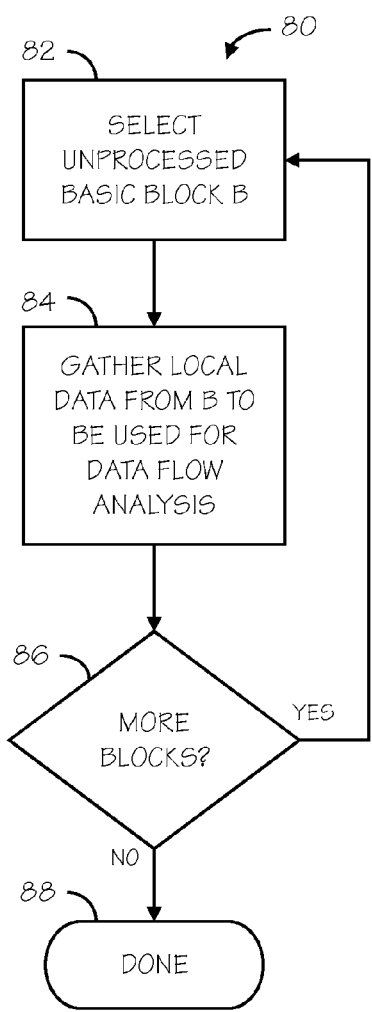
FIG. 5 is a flowchart of a non-parallel method of gathering local data for a data flow analysis.

A non-parallel data gathering process can be seen in flowchart 80 in FIG. 5. An unprocessed basic block B is selected (block 82). Local data is gathered from B to be used for data flow analysis (block 84). The local data gathered includes the GEN and KILL sets needed by global data flow analysis, which is described below. If there are more blocks to be processed ("Yes" branch of decision block 86), then processing continues with the next basic block at block 82. Otherwise the data gathering process completes at block 88.

Figure 6:
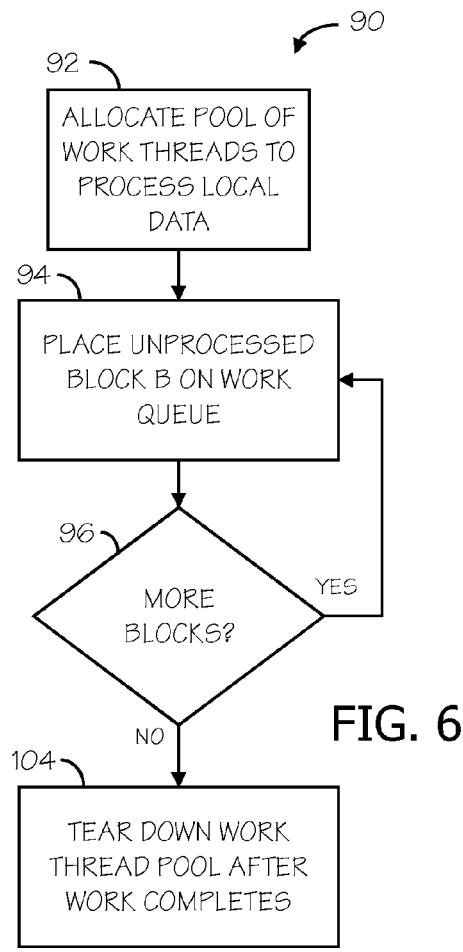
FIG. 6 is a flowchart of a parallelized method of gathering local data for a data flow analysis.

The data gathering phase is generally amenable to parallel processing. In some embodiments, one hardware thread may be spawned to process each basic block. Alternately, in other embodiments, a hardware thread may be spawned to handle groups of N blocks, where N can be optimally tuned through experimentation. In still other embodiments, hardware threads may process either single or groups of N blocks depending on the amount of work to be done for each block and the number of hardware threads available. A parallelized data gathering process can be seen in flowchart 90 in FIG. 6. In preparation for parallel processing, a pool of hardware threads is allocated to process the local data (block 92). The hardware threads may be divided into a main thread and work threads for different processing aspects. For example, the main thread may control the tasks assigned to the work threads. Additionally, there may be multiple main threads, where the main threads may also function as a work thread. The terms main thread and work thread, for the purposes of this disclosure, are merely being used for illustrative purposes. Any of the hardware threads allocated in the thread pool may be utilized for any of the tasks in the parallel processing.

Figure 6A:
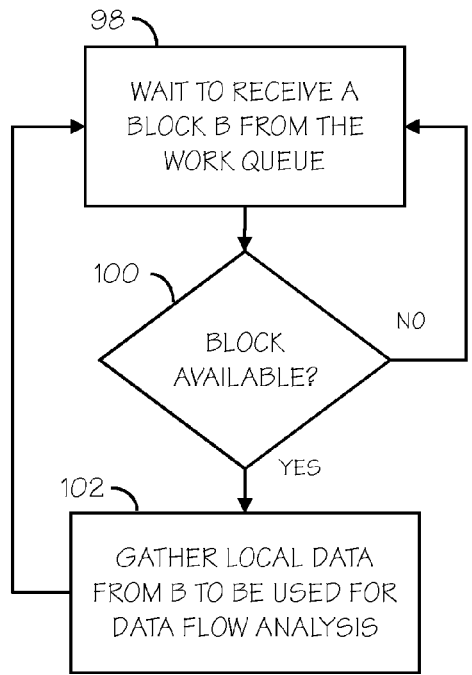
FIG. 6A is a detailed flowchart of an exemplary work thread of FIG. 6.

Returning to flowchart 90, an unprocessed basic block B is placed in a shared data structure, such as a work queue, by a main thread (block 94). If there are additional unprocessed blocks ("Yes" branch of decision block 96), the process continues by the main thread at block 94 continuing to place basic blocks on the work queue. While blocks are being placed on the work queue, in FIG. 6A, each of the work threads in the pool waits to receive a basic block B from the work queue (block 98). If a basic block B is available ("Yes" branch of decision block 100), a work thread in the pool gathers local data from the basic block B to be used for the data flow analysis (block 102). If a block is not available ("No" branch of decision block 100), then the process continues to wait at block 98. This data is similar to the data gathered in the non-parallel process in block 84 of FIG. 5. As each of the work threads completes its data gathering, the work thread waits to receive the next basic block B form the work queue in block 98 and the process continues. When all of the basic blocks B have been placed on the work queue, and all work threads have completed, the thread pool is dismantled (block 104). In other embodiments, each work thread may process groups of basic blocks B rather than a single block. In still other embodiments, work threads may process either single or groups of basic blocks B depending on the amount of work to be done for each block and the number of work threads available.

In some embodiments, it may be desirable to minimize data contention that might otherwise limit the ability for hardware threads to work independently of one another. For example, in an available expressions problem, each expression found in the program is mapped to a unique number, typically by a hashing to see if the expression has previously been seen. Care must be taken to ensure that the lookup table of expressions does not become a parallelism-killing bottleneck. If N is a fairly large number, it may be practical to have each work thread use a private lookup table, and merge the table results when the work threads join. Alternatively, a group of contiguous block numbers may be assigned to a work thread to be processed together. This alternative approach may leverage spatial locality in the data structures, reducing contention.

Global Data Flow Analysis

Data flow analysis refers to a body of techniques that derive information about the flow of data along program execution paths. In each application of data flow analysis, every program point is associated with a data flow value that represents an abstraction of the set of all possible program states that can be observed for that point. The set of possible data flow values is the domain for this application. The data flow values before and after each statement s are generally denoted by IN[s] and OUT[s], respectively. The data flow problem is to find a solution to a set of equational constraints on the IN[s]'s and OUT[s]'s for all statements s. The problem may be simplified by calculating these sets at basic block boundaries, denoting them as IN[B] and OUT[B] for each basic block B.

Data flow analysis has been well understood for many years. Those of ordinary skill in the art would be familiar with data flow analysis; however, a short description is provided here. As described in Aho et al.,[1] most data flow problems can be described in terms of a general data flow framework. Such a framework includes a set V of values to be propagated; a set of transfer functions F mapping from V to V for propagating these values through a basic block B; and a confluence operator operating on V that describes how to merge values from multiple blocks to their common successor or predecessor block. The set V should form a lattice, with distinct bottom and top elements (often the empty set and the universal set over V, respectively).

[1] AHO ET AL., COMPILERS PRINCIPLES, TECHNIQUES, & TOOLS §§9.2 & 9.3 (2d ed. 2007)

A data flow problem may be either a forward problem, in which values flow from the beginning of the program towards the end; or a backward problem, in which values flow from the end of the program towards the beginning. The transfer functions F are usually characterized in terms of sets GEN[B] and KILL[B] for each basic block B, indicating the data flow information generated by the statements in B, and the data flow information which is prevented from flowing through by the statements in B. The confluence operator should be monotonic; that is, applying it will always cause the propagated sets to become no smaller, or will always cause the propagated sets to become no larger. Thus data flow problems may be characterized as either increasing or decreasing problems.

A few examples may assist in clarifying the data flow analysis. A reaching definitions problem calculates which definitions of variables are available at each point in the program. In this case, V may consist of all subsets of the set of definitions in the program. Its bottom element is the empty set, and its top element is the set of all definitions in the programs. GEN[B] is the set of all definitions occurring in basic block B that reach the end of B. KILL[B] is the set of all definitions in the program which cannot flow through block B because the defined variable may be redefined in block B. F is the set of functions OUT[B]=GEN[B]Y(IN[B]−KILL[B]), for each block B. The confluence operator is union, so that IN[B] is formed from the union of OUT[P] over all predecessors P of B, since a definition that reaches along any path to a block is considered to reach it. Reaching definitions is a forward, increasing problem.

An available expressions problem calculates which expressions are available for reuse at each point in the program. In this case, V consists of all subsets of the set of expressions computed by the program. Its bottom element is the empty set, and its top element is the set of all expressions computed by the program. GEN[B] is the set of all expressions computed in block B and still available at the end of B. KILL[B] is the set of expressions which cannot flow through block B because at least one variable involved in the expression may be redefined in block B. F is the set of functions OUT[B] =GEN[B]Y(IN[B]−KILL[B]), for each block B. The confluence operator is intersection, so that IN[B] is formed from the intersection of OUT[P] over all predecessors P of B, since an expression is only available at B if it is available along all paths by which B might be reached. Available expressions is a forward, decreasing problem.

A live variables problem calculates which variables are expecting to receive a value at each point in the program. In this case, V consists of all subsets of the set of variables in the program. Its bottom element is the empty set, and its top element is the set of all variables in the program. GEN[B] is the set of all variables appearing on the right hand side of a calculation in block B, and which are not previously defined in B. KILL[B] is the set of all variables that may be defined in block B. F is the set of functions IN[B]=GEN[B]Y(OUT[B]− KILL[B]). The confluence operator is union, so that OUT[B] is formed from the union of IN[S] over all successors S of B, since a variable is considered live at the end of B if it is live along any path leaving B. Live variables is a backward, increasing problem.

Figure 7:
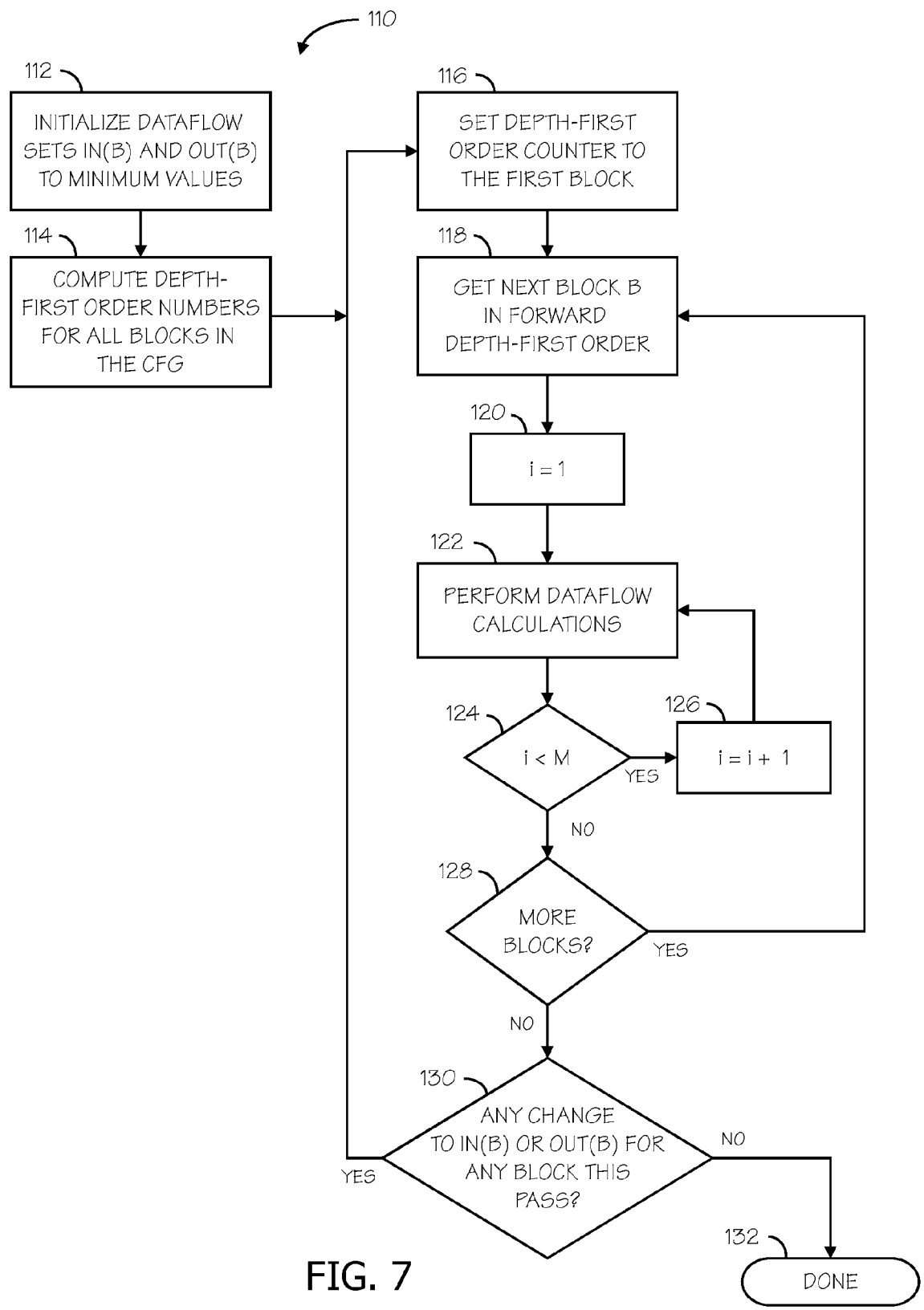
FIG. 7 is a flowchart of a non-parallel method for performing data flow analysis.

Returning again to the drawings, a non-parallel process for data flow analysis can be seen in flow chart 110 in FIG. 7. The flow chart 110 assumes a forward, increasing data flow problem. Data flow sets IN(B) and OUT(B) are initialized to minimum (bottom) values (block 112). If a decreasing problem were under analysis, the data flow sets IN(B) and OUT (B) may be initialized to maximum (top) values. Depth-first order numbers are then computed for all blocks in the CFG (block 114), using techniques well known in the art.

The depth-first order counter is set to the first block (block 116). In a reverse analysis, the depth-first order counter may be set to the last block. The next basic block B in forward depth-first order is retrieved (block 118). In a reverse analysis, the reverse depth-first order block is retrieved. A counter "i" is set to 1 (block 120). Data flow calculations for the retrieved basic block B are performed (block 122). For example, if the problem under analysis is a forward, increasing problem using union as the confluence operator, the calculations may be:

$$IN(B, i) = \underset{P \in predessor(B)}{Y} OUT(P, i)$$

$$OUT(B, i) = GEN(B, i)Y(IN(B, i) - KILL(B, i))$$

If the counter "i" is less than the number of data points M to determine at the basic block boundary ("Yes" branch of decision block 124), then the counter "i" is incremented (block 126) and the data flow calculations are performed for the next data point in the basic block B (block 122). In practice, the loop 120-126 will handle 32 or 64 values of "i" at a time depending on the word size of the machine. In these cases, "i" would be incremented by 32 or 64, depending on the word size.

After the loop has completed, a check is made to determine if there are more basic blocks B to process (block 128). If there are additional basic blocks ("Yes" branch of decision block 128), the process continues at block 118 until all basic blocks have been processed. If there is a change to IN(B) or OUT(B) for any basic block during this pass of the data flow analysis ("Yes" branch of decision block 130), then the process is repeated at block 116. Otherwise the data flow analysis completes at block 132.

Many global data flow analyses are generally represented as bit matrices. Each row in the matrix represents information for the beginning or end of a basic block, while each column represents whether or not a particular fact is true for each of the control flow points. Data flow analysis sets IN, OUT, GEN, KILL may be represented as N×M bit matrices, where N is the number of blocks and M is the number of data points to determine at each block boundary. For example, in the live variable problem a set bit in row 5 and column 10 of matrix IN might mean that variable X (assigned to column 10) is live on entry to basic block 5 (assigned to row 5). Global data flow analysis uses the starting initial values of IN, OUT, GEN and KILL as a basis to determine global information across the program, by performing logical operations on rows from the bit matrices representing these sets.

An important aspect of the global analyses is that typically the results are column-wise independent. The arrangement of the data flow problem into bit matrix form, therefore, may be designed to take advantage of the natural parallelism of processing 32 or 64 bits at a time with a single AND, OR, XOR, NOT, etc. instruction. If, however, the number of columns exceeds the word size of the host computer, no additional parallelism may be gained by using the bit matrix, and more parallelism may be obtained by partitioning the matrix.

Thus the bit matrix can be partitioned into sets of columns, using some multiple of the natural word size of the host computer as the number of columns per thread. The problem can be solved in parallel using the original storage in situ, since there is no overlap in storage requirements across the individual threads. This is a very clean and natural source of parallelism, with very little overhead in setup and teardown.

Figure 8:
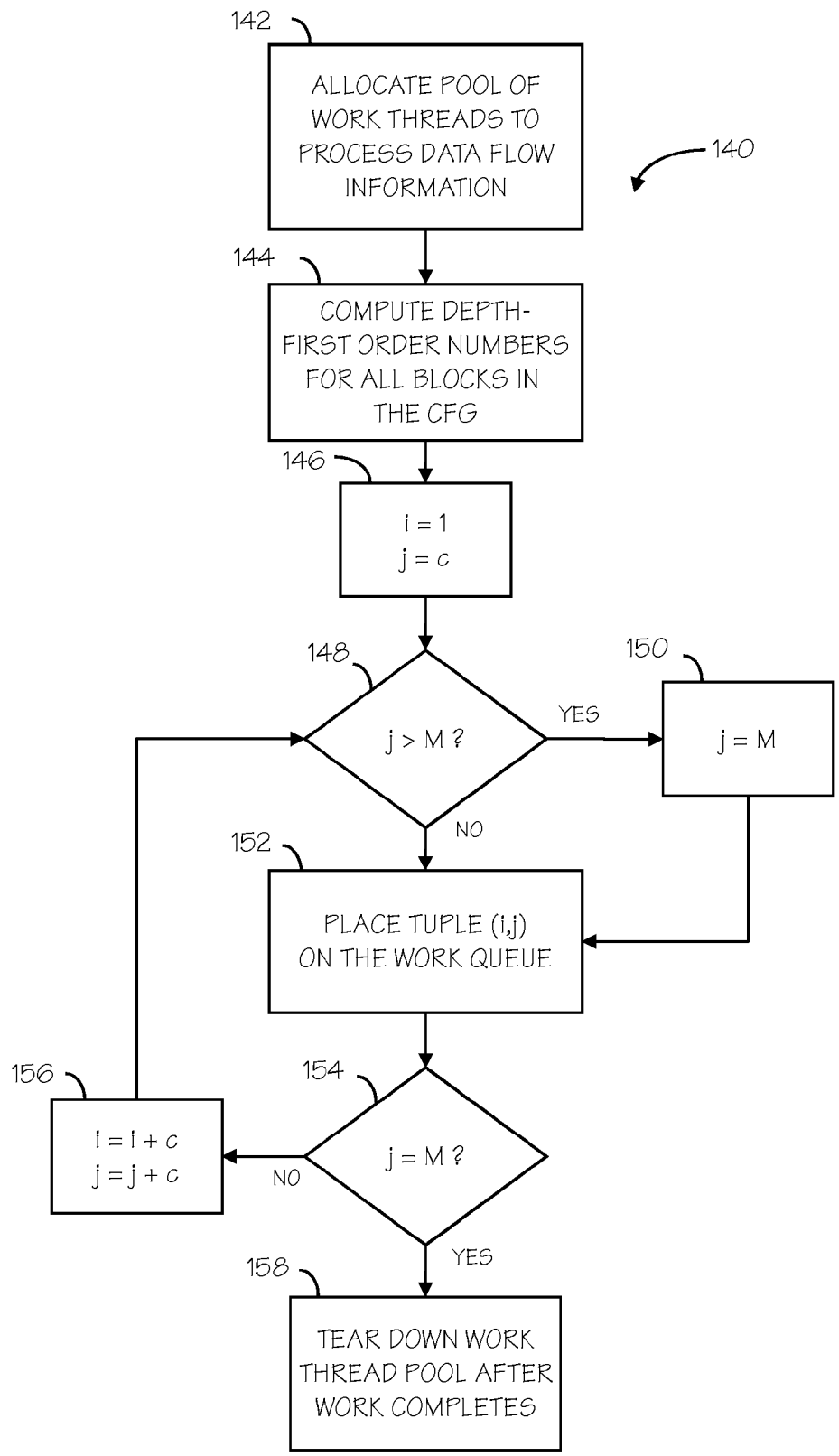
FIG. 8 is a flowchart of a parallelized method of performing data flow analysis.

A parallelized method of global data flow analysis can be seen in flowchart 140 in FIG. 8. A pool of hardware threads to process data flow information is allocated (block 142). Depth-first order numbers are computed by a main thread for all blocks in the CFG (block 144). A counter "i" is set to 1 and a counter "j" is set to c, where c is the number of bits in a data cache line (block 146). Note that the cache size is generally a multiple of the word size of the machine. If counter "j" is greater than the total number of data points M ("Yes" branch of decision block 148), then counter j is set equal to M (block 150). The tuple (i,j) is then placed on the work queue by the main thread for more processing (block 152). If counter j is not equal to M ("No" branch of decision block 154), then counters i and j are incremented by c (block 156) and the loop continues at block 148 until all data points have been placed on the work queue (in groups of "c"). If all tuples to be processed have been placed on the work queue ("Yes" branch of decision block 154), then the thread pool may be dismantled as the work threads complete (block 158).

Figure 8A:
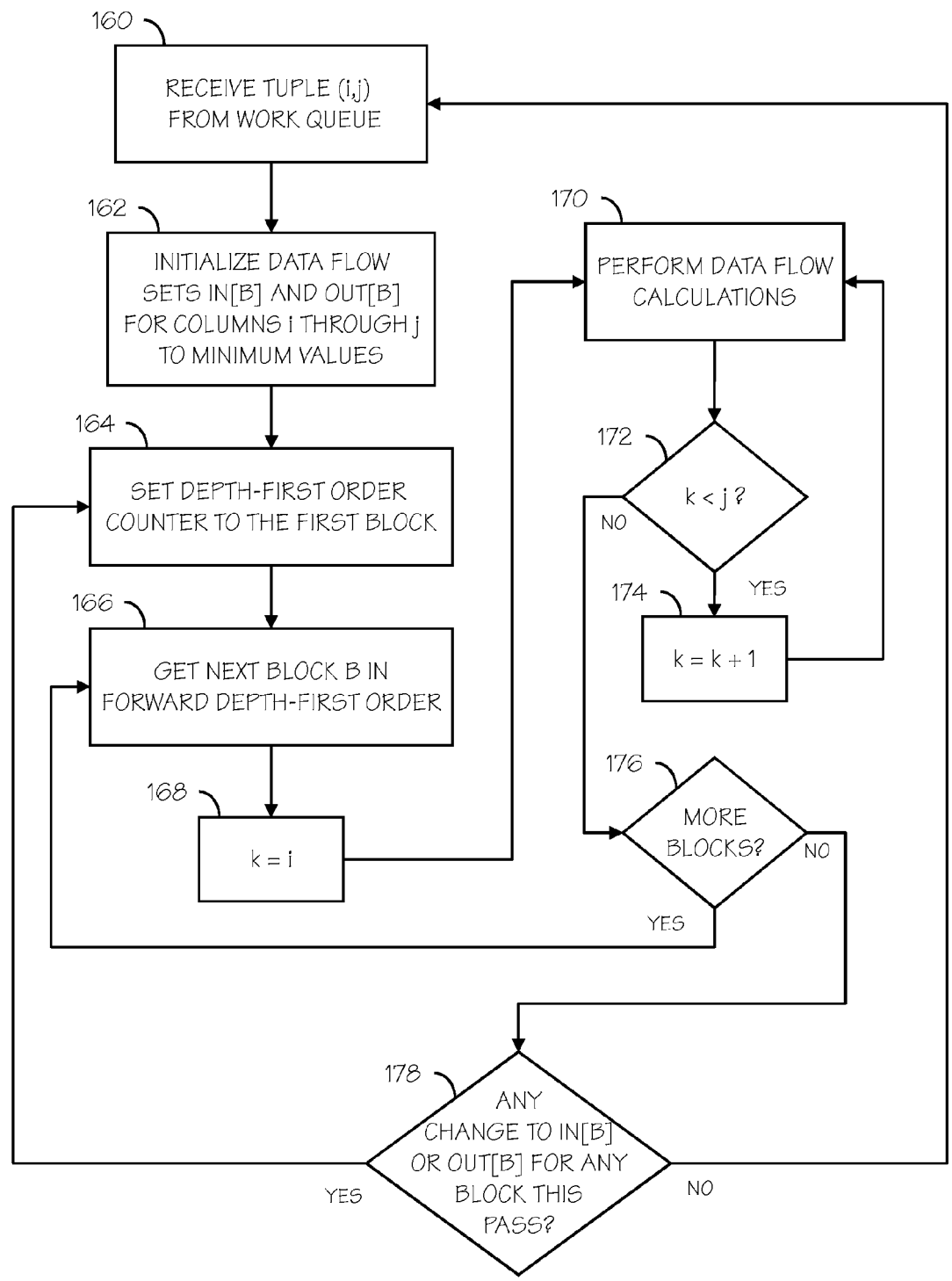
FIG. 8A is a detailed flowchart of an exemplary work thread of FIG. 8.

While the tuples (i, j) are being placed on the work queue by the main thread, in FIG. 8A, each of the work threads in the pool waits to receive a tuple from the work queue (block 160). Data flow sets IN[B] and OUT[B] are initialized for columns "i" through "j" to minimum values (block 162). The depth-first order counter is set to the first block (block 164). The next block is retrieved in forward depth-first order (block 166). A counter "k" is set to "i" (block 168) and data flow calculations are then performed as set forth above in the examples (block 170). If counter "k" is less than "j" ("Yes" branch of decision block 172), then "k" is incremented by one (block 174) and additional data flow calculations are performed (block 170). If counter "k" is not less than "j" ("No" branch of decision block 172), then a check is made to determine if more blocks are available (block 176). If more blocks are available ("Yes" branch of decision block 176), then the next block is retrieved in forward depth-first order (block 166) and data flow calculations are performed for that block (block 170). If there are no more blocks, then a check is made to determine if there was a change to IN[B] or OUT[B] for any block in this pass (block 178). If there was a change to IN[B] or OUT[B] ("Yes" branch of decision block 178), then the process is repeated beginning at block 164. If, however, there was no change ("No" branch of decision block 178), then the next tuple is received from the work queue (block 160). This process continues until all tuples have been processed and the work queue is empty.

In addition to the data flow calculations mentioned above, there may be some row-wise independence in the calculations as well. Data flow algorithms, as their name suggests, flow data from one basic block to its successors (or predecessors, for reverse algorithms). Calculations for a block may proceed whenever the calculations for all of its predecessors have completed. This means that calculations for a number of blocks can proceed in parallel, by enabling the calculations to be scheduled on a processor core when all data is available. If scheduling and communication overhead is sufficiently large that scheduling single blocks is impractical, larger single-entry/single-exit regions of code can be similarly scheduled when their dependencies have been resolved.

Propagating Data Flow Results

Phase 3 is similar to phase 1 (data gathering) in that each basic block can be processed independently. In phase 2 (data flow analysis), information has been gathered describing the state of expressions, variables, etc. at the boundaries of basic blocks. The propagation of data flow results phase steps either forward or backward through the basic blocks and propagates the collected information. A non-parallel process can be seen in flowchart 180 in FIG. 9. An unprocessed basic block B is selected (block 182). The statements in B are stepped through in a forward direction (or backward for a reverse analysis), adjusting data flow information and applying optimizations (block 184). For some optimizations, code modification can be performed at this time; for example, a redundant expression can be removed and replaced with a register holding the result of an identical computation. If more basic blocks B need to be processed ("Yes" branch of decision block 186), then the process continues at block 182 until all basic blocks have been processed ("No" branch of decision block 186) and the process completes (block 188).

Each basic block can be processed independently, so again a group of N blocks can be handled by a single thread. Once again, very little setup and teardown may be necessary to parallelize this phase. A parallelized process for propagating data flow results can be seen in flowchart 190 in FIG. 10. A pool of hardware threads is allocated for optimizing the basic blocks B (block 192). An unprocessed block is placed on the work queue by a main thread (block 194). If there are additional blocks ("Yes" branch of decision block 196), these blocks are placed on the work queue until there are no further blocks. While the unprocessed blocks are being placed on the work queue by the main thread, a work thread from the thread pool in FIG. 10A waits to receive a block from the work queue (block 198). If a basic block B is available ("Yes" branch of decision block 200), the work thread then steps through the statements in the block, similar to the non-parallel process in FIG. 9, and adjusts the data flow information and applies optimizations (block 202). The work thread then waits to receive another block from the work queue in block 198. Otherwise if a basic block is not available ("No" branch of decision block 200), then the process waits at block 198. When all of the basic blocks B have been placed on the work queue, and the work threads have completed, the thread pool is dismantled (block 204). In some embodiments, each work thread may process groups of basic blocks B rather than a single block. In other embodiments, work threads may process either single or groups of basic blocks B depending on the amount of work to be done for each block and the number of work threads available. It may also be desirable in some embodiments to ensure that the threads can independently write to private sections of the storage containing the internal representation of the program.

Applying Optimizations to Loops

Figure 11:
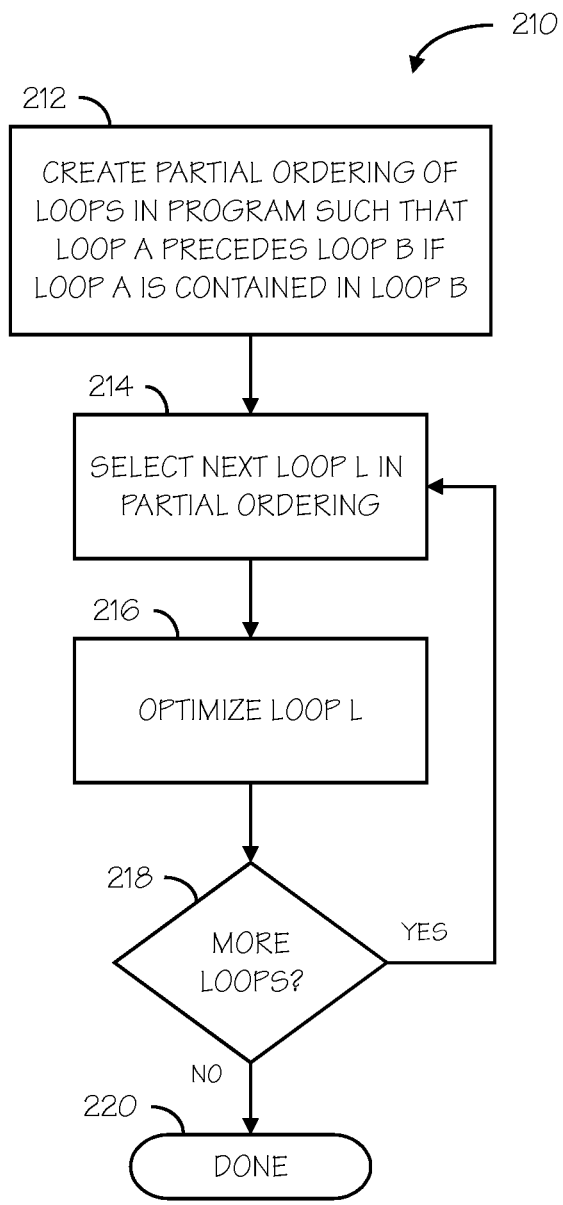
FIG. 11 is a flowchart of a non-parallel method for optimizing loops.

Some optimizations are not local to single blocks, but instead operate on larger portions of code. For example, some operate on loops rather than basic blocks. A non-parallel optimization of loops can be seen in flowchart 210 in FIG. 11. A partial ordering of loops in a program is created (block 212). Loops in the program need to be ordered such that inner loops are optimized prior to outer loops. After the loops have been ordered, the next loop in the partial ordering is selected (block 214). The loop is then optimized (block 216). If there are more loops to be optimized ("Yes" branch of decision block 218), then the process continues at block 214. After all loops have been optimized ("No" branch of decision block 218), the loop optimization is complete (block 220).

Figures 12, 12A:
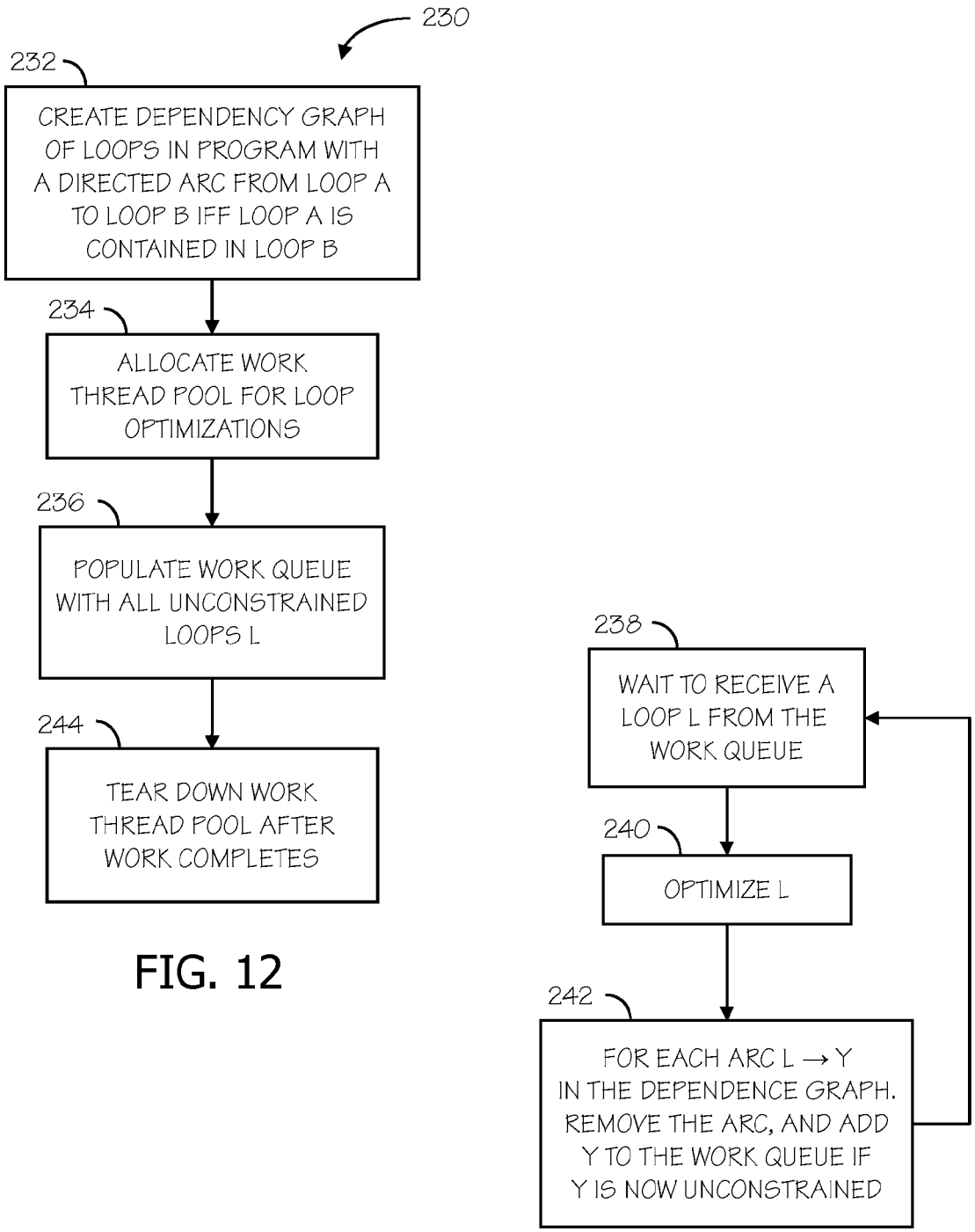
FIG. 12 is a flowchart of a parallelized method of optimizing loops.
FIG. 12A is a detailed flowchart of an exemplary work thread of FIG. 12.

In parallelizing the optimization of loops, in some embodiments a hardware thread may be allocated to optimize each strongly connected component (loop) in the control flow graph. Loops may be nested, so it is important to first process inner loops and wait to allocate hardware threads for outer loops until all inner loops have been processed. A parallelized process for loop optimization can be seen in flowchart 230 in FIG. 12. A dependency graph of the loops in the program is created to identify loops contained within other loops (block 232). A hardware thread pool is then allocated for optimizing the loops (block 234). The work queue is populated with all unconstrained loops (block 236). A constrained loop is a loop that contains inner loops that must be optimized prior to optimizing the constrained loop. While the work queue is being populated, in FIG. 12A, work threads in the thread pool wait to receive a loop from the work queue (block 238). The loop is then optimized (block 240). After optimizing the loop, the dependence graph is referenced, removing any dependency resulting from the optimized loops. If a constrained loop is now unconstrained, the newly unconstrained loop is added to the work queue (block 242). The dependence graph may be a point of contention among the main thread (populating the work queue) and the work threads (removing dependencies and populating the work queue). The graph should generally be serialized so only one thread at a time can update it (one writer, many readers). After the thread completes the loop optimization, the thread waits to receive the next loop at block 238. After all of the loops have been processed by the thread pool, the thread pool is dismantled (block 244).

It is important to note that not all optimizations are amenable to partition by blocks, loops, or other control flow units. Such optimizations, though rare, are more challenging to parallelize. Even in such cases, however, the data flow analysis enabling such optimizations is still usually subject to decomposition as previously described. Using these techniques, many classes of data flow analyses and optimization can leverage multiple hardware threads to achieve compile time speed-ups.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A method for parallelizing analysis and optimization in a compiler, the method comprising:
   identifying a subset of data points of a computer program for processing by a main thread selected from a plurality of hardware threads;
   placing the subset of data points in a shared data structure by the main thread;
   concurrently with placing the subset of data points in the shared data structure, retrieving a tuple associated with the subset of data points from the shared data structure by a work thread selected from the plurality of hardware threads; and
   performing compiler analysis on the tuple by the work thread in parallel with at least one other work thread performing compiler analysis on another tuple, wherein performing the compiler analysis on the tuple comprises:
      initializing data flow sets for data flow calculations; and
      performing the data flow calculations on the subset of data points by the work thread.

2. The method of claim 1, wherein the subset of data points corresponds to a cache size.

3. A method for parallelizing analysis and optimization in a compiler, the method comprising:
   preparing a plurality of basic blocks of a computer program for processing by a main thread selected from a plurality of hardware threads;
   placing the plurality of prepared basic blocks in a shared data structure by the main thread;
   concurrently with placing basic blocks in the shared data structure, retrieving a prepared basic block of the plurality of prepared basic blocks from the shared data structure by a work thread selected from the plurality of hardware threads; and
   performing at least one of a compiler analysis and optimization on the prepared basic block by the work thread in parallel with at least one other work thread performing at least one of the compiler analysis and optimization on another prepared basic block.

4. The method of claim 3 wherein performing the at least one of the compiler analysis and optimization on the prepared basic block comprises:
   gathering local data from the basic block for use in a data flow analysis.

5. The method of claim 3 wherein performing the at least one of the compiler analysis and optimization on the prepared basic block comprises:
   stepping through statements in the basic block;
   adjusting data flow information; and
   applying optimizations.

6. The method of claim 3, wherein preparing a plurality of basic blocks comprises:
   creating a dependency graph of a plurality of loops in a program; and
   identifying a plurality of unconstrained loops on the dependency graph.

7. The method of claim 6, wherein placing the plurality of prepared basic blocks in the shared data structure comprises:
   placing the plurality of unconstrained loops on the shared data structure.

8. The method of claim 7, wherein retrieving the prepared basic block comprises:
   receiving a loop from the shared data structure.

9. The method of claim 8, wherein performing the at least one of the compiler analysis and optimization on the prepared basic block comprises:
   optimizing the received loop by the work thread.

10. The method of claim 9 further comprising:
    removing a dependency from a loop containing the optimized loop; and placing the containing loop on the shared data structure.

11. An apparatus comprising:
    at least one processor;
    a plurality of hardware threads associated with the at least one processor; and
    program code configured to be executed by the at least one processor for parallelizing analysis and optimization in a compiler, the program code configured to prepare a plurality of basic blocks of a computer program for processing by a main thread selected from the plurality of hardware threads, place the plurality of prepared basic blocks in a shared data structure by the main thread, concurrently with placing basic blocks in the shared data structure, retrieve a prepared basic block of the plurality of prepared basic blocks from the shared data structure by a work thread of the plurality of hardware threads, and perform at least one of a compiler analysis and optimization on the prepared basic block by the work thread in parallel with at least one other work thread performing at least one of the compiler analysis and optimization on another prepared basic block.

12. The apparatus of claim 11, wherein the program code is configured to perform the at least one of the compiler analysis and optimization on the prepared basic block by:
    gathering local data from the basic block for use in a data flow analysis.

13. The apparatus of claim 11, wherein the program code is configured to perform the at least one of the compiler analysis and optimization on the prepared basic block by:
   stepping through statements in the basic block;
   adjusting data flow information; and
   applying optimizations.

14. The apparatus of claim 11, wherein the program code is configured to prepare a plurality of basic blocks by:
   creating a dependency graph of a plurality of loops in a program; and
   identifying a plurality of unconstrained loops on the dependency graph.

15. The apparatus of claim 14, wherein the program code is configured to place the plurality of prepared basic blocks in the shared data structure by:
   placing the plurality of unconstrained loops in the shared data structure.

16. The apparatus of claim 15, wherein the program code is configured to retrieve the prepared basic block by:
   receiving a loop from the shared data structure.

17. The apparatus of claim 16, wherein the program code is configured to perform the at least one of the compiler analysis and optimization on the prepared basic block by:
   optimizing the received loop by the work thread.

18. The apparatus of claim 17, wherein the program code is further configured to:
   remove a dependency from a loop containing the optimized loop; and
   place the containing loop on the shared data structure.

19. A program product, comprising
   a non-transitory computer readable medium; and
   a program code configured for parallelizing analysis and optimization in a compiler, the program code resident on the computer readable medium and to identify a subset of data points of a computer program for processing by a main thread selected from a plurality of hardware threads, place the subset of data points in a shared data structure by the main thread, concurrently with placing the subset of data points in the shared data structure, retrieve a tuple associated with the subset of data points from the shared data structure by a work thread selected from the plurality of hardware threads, and perform compiler analysis on the tuple by the work thread in parallel with at least one other work thread performing compiler analysis on another tuple, wherein the program code is configured to perform the compiler analysis on the tuple by,
   initializing data flow sets for data flow calculations; and
   performing the data flow calculations on the subset of data points by the work thread.

20. The program product of claim 19, wherein the subset of data points corresponds to a cache size.

\* \* \* \* \*